UNITED STATES PATENT OFFICE.

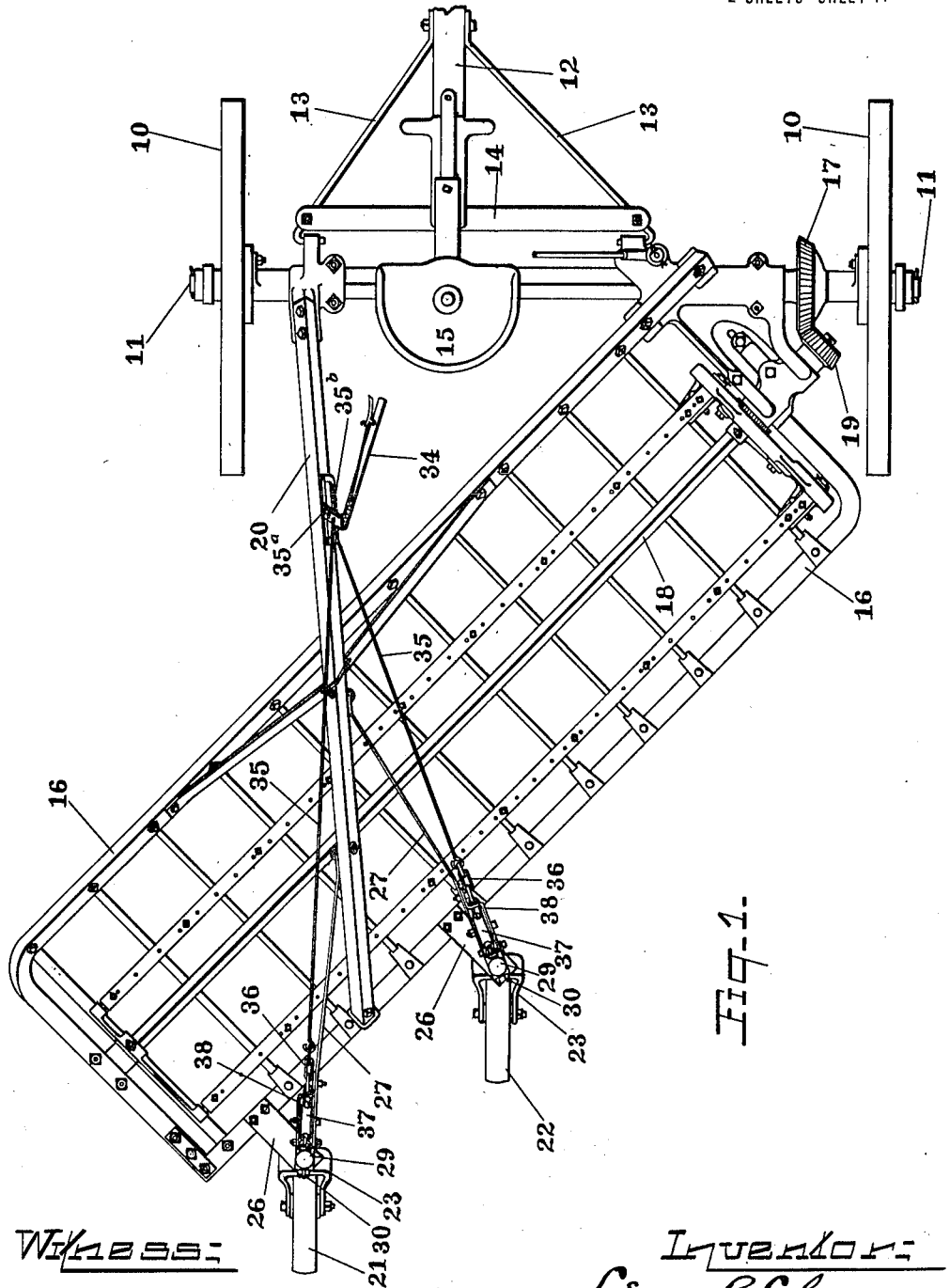

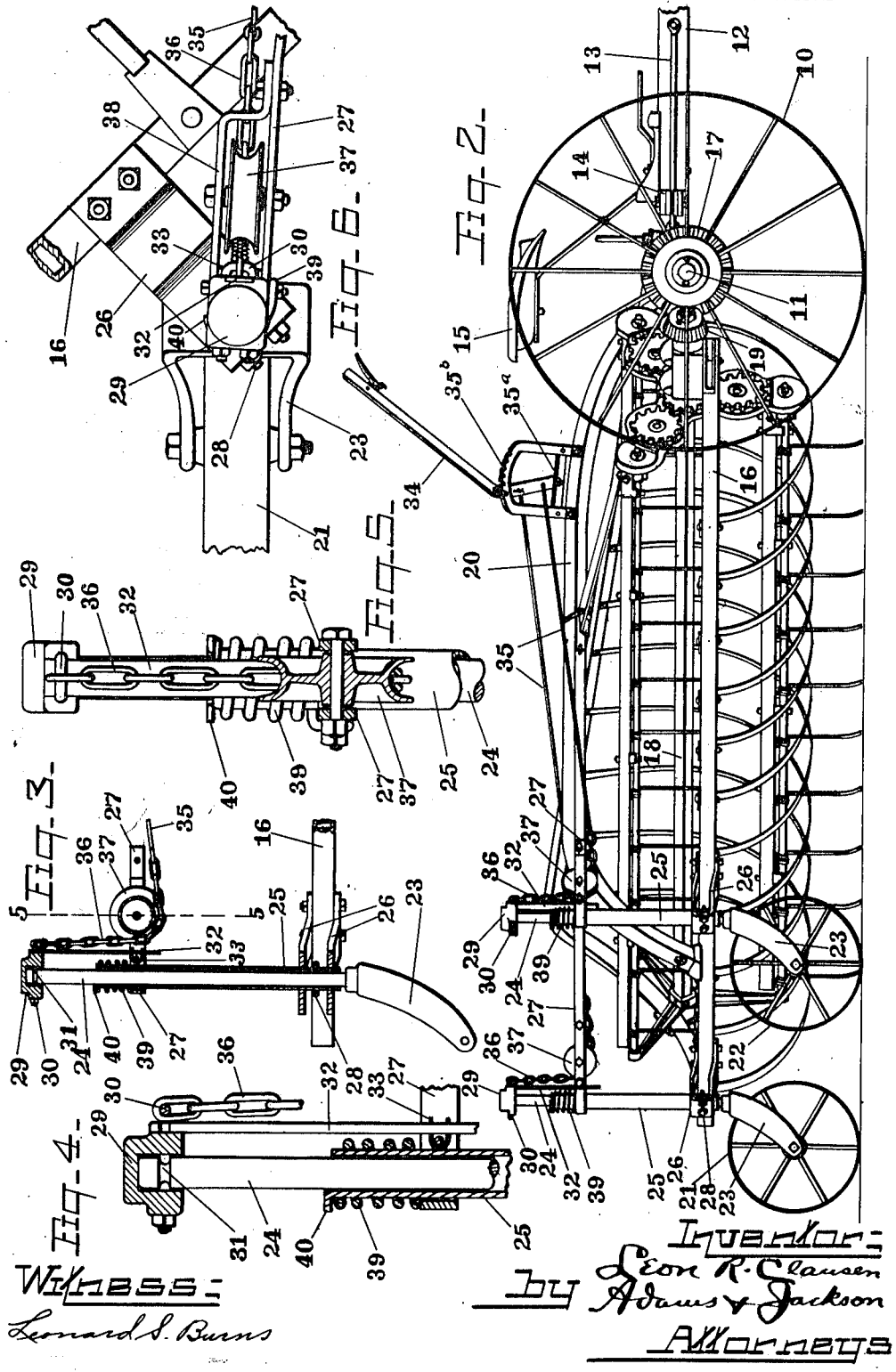

LEON R. CLAUSEN, OF OTTUMWA, IOWA, ASSIGNOR TO THE DAIN MANUFACTURING COMPANY OF IOWA, OF OTTUMWA, IOWA, A CORPORATION OF IOWA.

SIDE-DELIVERY ROTARY RAKE.

1,313,880.   Specification of Letters Patent.   Patented Aug. 26, 1919.

Applicaiton filed November 6, 1916. Serial No. 129,877.

*To all whom it may concern:*

Be it known that I, LEON R. CLAUSEN, a citizen of the United States, and a resident of Ottumwa, in the county of Wapello, State of Iowa, have invented certain new and useful Improvements in Side-Delivery Rotary Rakes, of which the following is a specification, reference being had to the accompanying drawings.

This invention relates to improvements in side-delivery rotary rakes of the same general type as the rake shown and described in the Letters Patent of the United States, Number 886,681, granted on the fifth day of May, 1908, upon the application of Joseph Dain. In some cases it is deemed desirable to employ in connection with such rakes two supporting caster-wheels at the rear of the reel-frame instead of one such wheel as shown in said patent, and it is with reference to such two-wheeled structures that my invention particularly relates. In side-delivery rakes provided with two such supporting caster-wheels it is desirable that in any position of adjustment of the raking reel, relative to the ground, the same amount of weight shall be carried on each of such wheels. As the main axle of the machine is the axis about which the rear end of the reel moves when such end is adjusted toward or from the ground it follows, of course, that the extreme end of the reel, where the rearmost caster-wheel is located, moves through a greater arc whenever such an adjustment is made than does the more central portion of the reel where the other one of the two caster-wheels is located. It is the leading object of my invention to provide a construction whereby through a single lever connected with both of such caster-wheels the rear or outer end of the reel can be readily raised and lowered and at the same time cause each caster-wheel during such adjusting to always properly bear its proportionate part of the weight. It is a further object to provide means that will insure the reel being lifted to the same extent as that one of the two caster-wheels which may strike and ride over an obstruction, and that will hold the reel supported on one of the wheels in normal working position if the other wheel drops into a depression in the ground. It is also an object of the invention to improve rakes of the type specified in various details, all as hereinafter particularly described. Those things believed to be new will be pointed out in the claims.

In the drawings:—

Figure 1 is a plan view of a side-delivery hay-rake embodying my improvements;

Fig. 2 is a side elevation of the rake;

Fig. 3 is a side elevation, partly in section, of one of the caster-wheel standards and some parts connected therewith;

Fig. 4 is an enlarged view partly in elevation and partly in vertical section of the upper part of one of the caster-wheel standards and some of the parts connected therewith;

Fig. 5 is a vertical section at line 5—5 of Fig. 3; and

Fig. 6 is a detail, being a plan view of one of the caster-wheels and attached parts.

Referring to the several figures of the drawings in which corresponding parts are indicated by like reference characters,—10 indicates a pair of carrying wheels mounted upon an axle 11, the wheels and axle being so connected together by any suitable means as to cause the axle to rotate upon the forward movement of the machine. 12 indicates a tongue laterally supported by braces 13. 14 indicates a cross-bar secured in front of the axle 10 and extending across the base of the tongue. 15 indicates a driver's seat mounted in any suitable manner upon the tongue 12 and cross-bar 14. 16 indicates a diagonally-arranged frame in which a reel of ordinary construction is mounted, such reel-supporting frame being connected with the axle in any suitable manner. Upon the axle 11 adjacent to the forward end of the reel-supporting frame is secured, so as to turn with the axle, a beveled gear 17 adapted to mesh with a beveled pinion 19 that is suitably secured upon the forward end of a shaft 18, which is preferably square in cross-section, that extends across the reel-frame from end to end. Through the gearing referred to the reel-shaft is driven, as fully explained in said Dain Patent, No. 886,681. 20 indicates the usual truss-bar member of the supporting frame of the machine, which member 20 is connected at its forward end with the axle 11 in any usual manner. It extends rearwardly over the reel and is secured at its other end to the rear member of the reel-frame.

At the rear of the reel-frame are secured two supporting caster-wheels, one of them—indicated by 21—being located adjacent to the rearmost end of such frame, and the other one—indicated by 22—being located adjacent the central portion thereof. For convenience, these caster-wheels will be designated respectively as the outer and inner caster-wheels. Each caster-wheel is journaled in a fork 23 from the upper face of which rises a standard 24 rigidly affixed to the fork. The standard passes through and is free to turn in a sleeve 25. The sleeve passes through and is held in vertical position by braces 26 and 27 near its lower and upper ends, respectively, the brace 26 being in the form of a U-shaped bracket, in the construction shown, whose ends are bolted to the rear bar of the reel-frame and the brace 27 being a bar whose forward end is secured to the truss member 20. A curved bolt 28 that embraces the sleeve and has its ends passing through the bracket 26 is also shown as being employed to hold the sleeve rigidly in place. 29 indicates caps or heads, one being mounted on the upper end of each standard. Each cap or head is secured by means of a U-shaped bolt 30 passing through the cap or head and lying in an annular groove 31 in the standard. This manner of securing the standard and its cap or head together permits of one part rotating relatively to the other, of course, but as it is desired that the cap or head shall be held against rotation I have provided it with a rigid downwardly-extending guiding-arm 32, which may be advantageously clamped to the cap or head by the U-shaped bolt 30 as shown, that extends into a slotted keeper 33 suitably secured to the brace member 27.

34 indicates an operating lever pivotally attached at 35ᵃ near its lower end to a fixed support, which, in the construction illustrated, is a bracket 35ᵇ secured upon the truss-bar 20 in convenient reach of the driver on his seat 15. This bracket 35ᵇ has its upper curved edge formed to constitute a toothed rack adapted to hold the usual spring-pressed latch of the lever in any adjusted position of the lever. To the lever are suitably attached two connections that extend respectively to the caps or heads 29 on the caster-wheel standards. Each of such connections comprises, in the construction shown, a stiff section 35 and a flexible section 36, the latter passing under a pulley 37 suitably journaled in place between a brace 27 and a metal strap 38 bolted to such brace (see Fig. 6). Such metal strap is best made integral with the brace 27,—the brace being bent around the sleeve 25 so that its turned end portion will lie parallel with the main portion of the brace and far enough removed therefrom to accommodate the pulley as best shown in said Fig. 6. One end of each chain or flexible section is connected to a cap or head 29, preferably by engagement with the bolt 30 as shown. 39 indicates a coiled spring around the upper end portion of each sleeve 25, being held in place between a flange 40 on the upper end of the sleeve and the brace 27 that connects with that sleeve. These springs provide cushions for the reel-frame.

It will be noted that the two connections between the single lever 34 and the two caster-wheel standards are not secured to the same place on the lever, but are located at different distances from the pivot of the lever (see Fig. 2), and that the point of attachment to the lever of that connection extending to the standard of the outer caster-wheel 21 is farther removed from the lever's pivot than is the point of attachment of the connection that extends to the standard of the inner caster-wheel 22. This construction and arrangement is of great importance, as by it each of the two caster-wheels will have imposed upon it a proportionate part of the weight regardless of the position to which the rear part of the reel may be adjusted. That this will be so will be evident when it is borne in mind that in all such adjustments the reel-frame turns on the axle 11 of the machine as an axis and, of course, that portion of the frame where the outer caster-wheel is located will, during such adjustment, move in a greater arc than that portion where the inner caster-wheel 22 is attached. This difference in degree of movement of the reel-frame at the points where the two caster-wheels are attached is compensated for with great exactness by making the points of attachment of the respective connections to the adjusting lever at different distances from the pivot of the lever, as above stated, and thereby the connection 35—36 that extends to the outer caster-wheel standard will travel a greater distance than the connection to the other or inner caster-wheel standard, and hence, on the assumption that the field is level, the caster-wheels will have the load substantially equally distributed between them. From the description of the parts hereinbefore given it will be evident that a forward stroke of the lever will, through the respective connections, (which in the construction shown are each formed of the two sections 35—36) raise the rear end of the reel-frame through the downward pull of the flexible sections 36 on the caps or heads of the caster-wheel standards. A reverse movement of the lever will of course permit a lowering of the rear end of the reel-frame in such manner as to also bring a proper distribution of the weight on the caster-wheels.

In passing over the ground if one of the caster-wheels passes into a rut or other depression such wheel will be free to drop a distance equal to the space between the cap or head 29 and the flange 40 on the upper end of the sleeve, the said cap or head then resting on such flange. At such time the weight theretofore borne by both caster-wheels will be transferred for the moment to the other caster-wheel and the normal level position of the reel-frame will not be disturbed. Likewise, the weight will be borne momentarily by that one of the caster-wheels that passes over an obstruction, the other wheel dropping, of course, and the reel-frame rising to the same extent as the wheel that encountered and passed over the obstruction. It will thus be seen that while both of the wheels are so connected to the single operating lever 34 that they are moved simultaneously when such lever is given a stroke in either direction yet each is free to drop independently when one or the other encounters a depression or obstruction, as above pointed out. The provision of means for insuring the cap or head 29 of each caster-wheel standard from turning is important for if it did turn when the chain or flexible section 36 of the connection was slack such chain section would tend to become wrapped around the standard, or the chain section might be so diverted from proper position that when the slack in the chain was attempted to be taken up by a forward stroke of the lever it would not run properly on its pulley 37. By providing the guide-arm 32 that depends from the cap or head and has a sliding fit in the keeper 33 such cap or head is prevented from rotating, while at the same time not interfering in any way with the free rotation of the standard upon which it is mounted.

What I claim as my invention and desire to secure by Letters Patent, is—

1. The combination with a diagonally-arranged side-delivery rake-frame, of two ground-engaging supports attached to the rear part of the frame at different distances from a plane passing through the frame at right angles to the line of travel of the machine, said supports being separately movable vertically relative to the frame, and means on the frame and connected with the supports for simultaneously applying a direct lifting force to the frame at two points to effect an adjustment of the frame relative to said supports.

2. The combination with a diagonally-arranged side-delivery rake-frame, of two ground-engaging supports attached to the rear part of the frame at different distances from a plane passing through the frame at right angles to the line of travel of the machine, said frame and supports being movable vertically relative to each other, and means carried by the frame and separately connected with said supports for simultaneously applying a direct lifting force to the frame at two points to effect an adjustment of the frame relative to the supports.

3. The combination with a diagonally-arranged side-delivery rake-frame, of two ground-engaging supports attached to the rear part of the frame at different distances from a plane passing through the frame at right angles to the line of travel of the machine, said supports being separately movable vertically, and means carried by the frame and separately connected with said supports for simultaneously applying a direct lifting force to the frame at two points to effect an adjustment of the frame relative to the supports.

4. The combination with a diagonally-arranged side-delivery rake-frame having rear supporting means comprising two ground-engaging devices located at different distances from a plane through the frame at right angles to the line of travel of the machine, said frame and supports being movable relative to each other, of an adjusting device common to both of said supports, and separate connections from the supports to different points on the adjusting device, such connections being also connected with the frame at separated points.

5. The combination with a diagonally-arranged side-delivery rake-frame having rear supporting means comprising two ground-engaging devices located at different distances from a plane through the frame at right angles to the line of travel of the machine, said frame and supports being movable relative to each other, of a lever pivotally supported on the frame and separately connected with each of said supports by connections attached at different points to said lever, said connections also being connected with said frame.

6. The combination with a diagonally-arranged side-delivery rake-frame having rear supporting means comprising two ground-engaging devices located at different distances from a plane through the frame at right angles to the line of travel of the machine, said frame and supports being movable relative to each other, of an adjusting device common to both of said supports, and separate flexible connections from the supports to different points on the adjusting device, such connections being also connected with the frame.

7. The combination with a diagonally-arranged side-delivery rake-frame, of two ground-engaging supports attached to the rear part of the frame and movable relative thereto and located at different distances from a plane passing through the frame at right angles to the line of travel of the machine, and an adjusting device common to both of said supports and separately connected therewith by connections attached at different points to said adjusting device and also connected with said frame, the said supports being located at different distances from said adjusting device.

8. The combination with an agricultural implement frame, of a lever pivotally mounted on the frame, two ground-engaging supports attached to the frame at the rear thereof and at different distances from said lever, and a separate connection from each of the supports to the lever, such connections being secured to the lever at different distances from the pivot thereof and also connected with the frame.

9. The combination with a diagonally-arranged frame and a wheeled support at its forward end, of a plurality of ground-engaging supports located at different distances in rear of the axis of said wheeled support, said frame and ground-engaging supports being vertically adjustable relative to each other, a single adjusting device, separate connections attached at different points to said adjusting device and extending to said ground-engaging supports, and means on said frame for engagement by said connections.

10. The combination with a diagonally-arranged frame and a wheeled support at its forward end, of a plurality of ground-engaging supports at its rear side arranged at different distances from the axis of said wheeled support, said frame and ground-engaging supports being vertically adjustable relative to each other, a single adjusting device, separate connections from said device to each of said ground-engaging supports, said connections being attached at different points to said adjusting device, and means on said frame for engagement by said connections.

11. The combination with a diagonally-arranged frame and a wheeled support at its forward end, of a plurality of ground-engaging supports, said frame and ground-engaging supports being vertically adjustable relative to each other, a single adjusting device, separate flexible connections from said device to each of said ground-engaging supports, said connections being attached at different points to said adjusting device, and pulleys journaled in the frame with one of which each of said flexible connections engages.

12. The combination with a diagonally-arranged frame and a wheeled support at its forward end, of a plurality of ground-engaging supports at the rear of the frame, said frame and ground-engaging supports being vertically adjustable relative to each other, a single lever, a separate connection from said lever to each of said ground-engaging supports, said connections being attached at different points to said lever, and means on said frame for engagement by said connections.

13. The combination with a diagonally-arranged frame and a wheeled support at its forward end, of a plurality of ground-engaging supports at its rear side arranged at different distances from the axis of said wheeled support, said frame and ground-engaging supports being vertically adjustable relative to each other, a single lever, a separate connection extending from each of said ground-engaging supports to said lever, the connection from the rearmost one of the ground-engaging supports being attached to the lever farther from the pivot of the lever than the point of attachment of the other connection, and means on the frame for engagement by said connections.

14. The combination with a diagonally-arranged frame and a wheeled support at its forward end, of a plurality of ground-engaging supports at its rear side, each comprising a standard having a swiveling engagement with the frame and said frame and ground-engaging supports being vertically adjustable relative to each other, a single operating device, separate connections attached to said operating device at different points and extending to the upper end of each standard, and means on the frame for engagement by said connections.

15. The combination with a diagonally-arranged frame and a wheeled support at its forward end, of a plurality of ground-engaging supports at its rear side, each comprising a standard having a swiveling engagement with the frame, and said frame and ground-engaging supports being vertically adjustable relative to each other, a single operating device, separate flexible connections attached to said operating device at different points and extending to the upper end of each standard, and pulleys on the frame under one of which each connection passes.

16. The combination with a diagonally-arranged side-delivery rake-frame, of two ground-engaging supports attached to the rear part of the frame at different distances from a plane passing through the frame at right angles to the line of travel of the machine, said frame and supports being movable vertically relative to each other, a single adjusting device secured on the rake-frame, separate flexible connections attached at different points to said adjusting device, pulleys on the frame under which said connections respectively pass, and means for attaching each connection to the upper member of one of the ground-engaging supports at a point above the pulley, whereby the frame will be normally supported at its rear end by both of said ground-engaging supports and their said flexible connections or be temporarily supported by one such support and its flexible connection when the other ground-engaging support drops when passing over a depression in the ground.

17. The combination with an agricultural-implement frame adapted to be raised and lowered at its rear end, of a caster-wheel having a vertical standard rotatably mounted in said frame, and said frame and standard being vertically adjustable relative to each other, a cap on the upper end of the standard, means for holding said cap against turning with the standard, a lever on the frame, a connection attached to said non-rotatable cap and to the lever, and means on the frame with which said connection engages.

18. The combination with an agricultural-implement frame adapted to be raised and lowered at its rear end, of a caster-wheel having a vertical standard rotatably mounted in said frame, and said frame and standard being vertically adjustable relative to each other, a cap on the upper end of the standard, a depending member carried by said cap and held in sliding engagement with a keeper carried by the frame to prevent turning of the cap with the standard, a connection attached to said non-rotatable cap and to the lever, and means on the frame with which said connection engages.

19. The combination with an agricultural-implement frame adapted to be raised and lowered at its rear end, of a caster-wheel having a vertical standard rotatably mounted in said frame, and said frame and standard being vertically adjustable relative to each other, a cap on the upper end of the standard, a U-shaped bolt passing through such cap and lying in an annular groove in the standard, means for preventing the cap from turning with the standard, a lever on the frame, a flexible connection attached to said non-rotatable cap and to the lever, and a pulley journaled in the frame and engaged by said connection.

20. The combination with an agricultural-implement frame adapted to be raised and lowered at its rear end, of a caster-wheel having a vertical standard rotatably mounted in said frame, and said frame and standard being vertically adjustable relative to each other, a cap on the upper end of the standard, a U-shaped bolt passing through said cap and lying in an annular groove in the standard, a depending guide member clamped to the cap by said bolt and having sliding engagement with a keeper on the frame, an operating lever, a flexible connection between said lever and non-rotatable cap, and a pulley journaled in the frame and under which such connection passes.

LEON R. CLAUSEN.